US012070957B2

(12) United States Patent
Nishihara et al.

(10) Patent No.: US 12,070,957 B2
(45) Date of Patent: Aug. 27, 2024

(54) PRINTING APPARATUS, PRINTING METHOD, AND NON-TRANSITORY COMPUTER-READABLE STORAGE MEDIUM

(71) Applicant: BROTHER KOGYO KABUSHIKI KAISHA, Nagoya (JP)

(72) Inventors: Keisuke Nishihara, Nagoya (JP); Akira Minami, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/305,329

(22) Filed: Apr. 22, 2023

(65) Prior Publication Data

US 2023/0347660 A1 Nov. 2, 2023

(30) Foreign Application Priority Data

Apr. 27, 2022 (JP) ................................ 2022-073046

(51) Int. Cl.
*B41J 2/355* (2006.01)
*B41J 2/325* (2006.01)
*B41J 2/35* (2006.01)

(52) U.S. Cl.
CPC ............... *B41J 2/355* (2013.01); *B41J 2/325* (2013.01); *B41J 2/35* (2013.01)

(58) Field of Classification Search
CPC ..... B41J 2/355; B41J 2/325; B41J 2/35; B41J 2/32; B41J 2/36; B41J 2/315; B41F 16/00; B41F 16/0006
See application file for complete search history.

(56) References Cited

U.S. PATENT DOCUMENTS 5,587,732 A * 12/1996 Kokubo .................. B41J 2/355 347/183
8,098,269 B2 * 1/2012 Busch .................... B41J 2/5056 347/171
2005/0174383 A1 * 8/2005 Inoue ....................... B41J 2/525 347/43
2021/0141328 A1 5/2021 Sasaki et al.

FOREIGN PATENT DOCUMENTS

JP 2008-6830 A 1/2008
JP 2019-214206 A 12/2019
WO 02/096665 A1 12/2002

* cited by examiner

*Primary Examiner* — Kristal Feggins
(74) *Attorney, Agent, or Firm* — KENEALY VAIDYA LLP

(57) ABSTRACT

When a CPU of a printing apparatus generates a red energization pattern for causing a print medium to develop a color, the CPU generates a subtraction pattern obtained by subtracting a portion of an amount of energy from a magenta energization pattern. The CPU calculates a logical sum of a yellow energization pattern and the subtraction pattern, to generate the red energization pattern.

12 Claims, 10 Drawing Sheets

PRINTING APPARATUS, PRINTING METHOD, AND NON-TRANSITORY COMPUTER-READABLE STORAGE MEDIUM

REFERENCE TO RELATED APPLICATIONS

This application claims priority from Japanese Patent Application No. 2022-073046 filed on Apr. 27, 2022. The entire content of the priority application is incorporated herein by reference.

BACKGROUND ART

There is a printing apparatus configured to perform printing on a print medium in which a plurality of color development layers for developing different colors are formed on a base material. For example, an image forming apparatus applies energy from a print head to a print medium having three color development layers having different color development characteristics, and controls a temperature and a period of the print head at that time, thereby forming an image on a desired color development layer. In the image forming apparatus, the period for applying heat is controlled in a range of about 0.001 to about 100 milliseconds for each line of an image. It is necessary to use a high-performance CPU for the control, and to heat the color development layers with an expensive print head with high heat responsiveness.

However, when performing printing on a print medium having a plurality of color development layers by using a general-purpose CPU and an inexpensive print head having a large heat capacity, it is difficult to maintain a constant temperature of the print head, and it is also difficult to perform rapid temperature rising and heat dissipation of heat-generating elements. For this reason, when causing each of a plurality of color development layers to develop each color, if a signal pattern having a logical sum of signal patterns for causing each individual color development layer to develop a color is used, excessive heat is applied to the print medium, so that it is difficult to cause a target color to be developed.

DESCRIPTION

An object of the present disclosure is to provide a printing apparatus, a printing method, and a non-transitory computer-readable storage medium storing a printing program capable of easily generating a signal pattern for causing each of a plurality of color development layers to develop each color, and capable of color development having high color developability.

According to a first aspect of the present disclosure, there is provided a printing apparatus including: a thermal head having a plurality of heat-generating elements aligned in a line form; a conveyor configured to convey a print medium in a conveying direction orthogonal to a serial direction in which the plurality of heat-generating elements are aligned in the terminal head, the printing apparatus being configured to form print dots on the print medium conveyed by the conveyor; a processor configured to: generate a signal pattern for causing the plurality of heat-generating elements to selectively generate heat based on image data; and control an application of energy to the heat-generating elements according to the signal pattern, for each printing cycle that is repeated continuously, in which the print medium includes at least: a first color development layer configured to develop a first color due to energy applied from the heat-generating elements; and a second color development layer having a color development characteristic different from that of the first color development layer and configured to develop a second color due to energy applied from the heat-generating elements, in which the signal pattern is configured by a pattern in which application information of indicating a period for applying energy to the heat-generating elements and non-application information of indicating a period not for applying energy to the heat-generating elements are combined, in which the processor is configured to generate the signal pattern by a combination of: a first signal pattern that is used in a case of causing the first color development layer singly to develop a color to form a print dot of the first color; a second signal pattern that is used in a case of causing the second color development layer singly to develop a color to form a print dot of the second color; and a third signal pattern that is used in a case of causing each of the first color development layer and the second color development layer to develop each color to form a print dot of a mixed color of the first color and the second color, and in which the third signal pattern is configured based on a logical sum of the first signal pattern and the second signal pattern, and is a pattern for applying a smaller amount of energy to the heat-generating elements than an amount of energy to be applied to the heat-generating elements according to a pattern configured by a mere logical sum of the first signal pattern and the second signal pattern.

The processor can easily generate the third signal pattern for causing the first color development layer and the second color development layer to develop colors, respectively, based on the first signal pattern and the second signal pattern. In addition, the amount of energy applied to the heat-generating elements in the third signal pattern is smaller than that in the pattern configured by the mere logical sum of the first signal pattern and the second signal pattern. Therefore, the printing apparatus can prevent excessive heat storage in the heat-generating elements even though the third signal pattern is configured based on the simple logical sum, and can generate the third signal pattern capable of color development having high color developability.

In the first aspect, the third signal pattern may be configured by a logical sum of the first signal pattern and a fourth signal pattern that is a pattern in which a part of the application information of the second signal pattern is subtracted and an amount of energy to be applied to the heat-generating elements is made smaller than that of the second signal pattern, and in the printing cycle, a print dot to be formed according to the first signal pattern may be completed to be formed earlier than a print dot to be formed according to the second signal pattern. When generating the third signal pattern, the processor generates the fourth signal pattern by subtracting the application information from the second signal pattern, and does not subtract the first signal pattern. Then, the third signal pattern is generated by a simple logical sum of the fourth signal pattern and the first signal pattern. Therefore, the processor can easily generate the third signal pattern. In addition, in the third signal pattern, the print dot of the first color formed by a part derived from the first signal pattern is completed to be formed earlier than the print dot of the second color formed by a part derived from the second signal pattern. Accordingly, the part derived from the second signal pattern is affected by the heat applied by the part derived from the first signal pattern, but the application information is subtracted from the part derived from the second signal pattern. Therefore, the printing apparatus can prevent excessive heat storage in the heat-generating elements and can perform color development having high color developability by performing printing using the third signal pattern.

In the first aspect, the third signal pattern may be configured by a logical sum of the second signal pattern and a fourth signal pattern that is a pattern in which a part of the application information of the first signal pattern is subtracted and an amount of energy to be applied to the heat-generating elements is made smaller than that of the first signal pattern, and in the printing cycle, a print dot to be formed according to the first signal pattern may be completed to be formed earlier than a print dot to be formed according to the second signal pattern. When generating the third signal pattern, the processor generates the fourth signal pattern by subtracting the application information from the first signal pattern, and does not subtract the second signal pattern. Then, the third signal pattern is generated by a simple logical sum of the fourth signal pattern and the second signal pattern. Therefore, the processor can easily generate the third signal pattern. In addition, in the third signal pattern, the print dot of the first color formed by a part derived from the first signal pattern is completed to be formed earlier than the print dot of the second color that is formed by a part derived from the second signal pattern. Accordingly, the part derived from the second signal pattern is affected by the heat applied by the part derived from the first signal pattern, but the effect of the heat caused by the part derived from the first signal pattern is mitigated by the subtraction of the application information. Therefore, the printing apparatus can prevent excessive heat storage in the heat-generating elements and can perform color development having high color developability by performing printing using the third signal pattern.

In the first aspect, the third signal pattern may be a pattern in which a part of the application information of a fourth signal pattern configured by a logical sum of the first signal pattern and the second signal pattern is subtracted and an amount of energy to be applied to the heat-generating elements is made smaller than that of the fourth signal pattern. When generating the third signal pattern, the processor generates the fourth signal pattern by a simple logical sum of the first signal pattern and the second signal pattern. Then, the third signal pattern is generated by subtracting the application information from the fourth signal pattern. Therefore, the processor can easily generate the third signal pattern. Then, the printing apparatus can prevent excessive heat storage in the heat-generating elements and can perform color development having high color developability by performing printing using the third signal pattern.

In the first aspect, in a case where the processor generates the third signal pattern, the processor may be configured to perform subtraction processing of reducing a number of chopping times on a part, in which chopper control of repeating the application information and the non-application information multiple times is performed, of the first signal pattern or the second signal pattern in which the application information is subtracted, to generate the fourth signal pattern. The processor can easily generate the fourth signal pattern by performing the subtraction processing of reducing the number of chopping times on the pattern as the subtraction source of the application information. Then, the third signal pattern is generated by a simple logical sum of the fourth signal pattern and a pattern for which the application information has not been subtracted. Therefore, the processor can easily generate the third signal pattern. Therefore, the printing apparatus can prevent excessive heat storage in the heat-generating elements and can perform color development having high color developability by performing printing using the third signal pattern.

In the first aspect, in a case where the processor generates the third signal pattern, the processor may be configured to perform subtraction processing of reducing a number of chopping times on a part, in which chopper control of repeating the application information and the non-application information multiple times is performed, of the fourth signal pattern in which the application information is subtracted, to generate the third signal pattern. The processor can easily generate the third signal pattern by performing the subtraction processing of reducing the number of chopping times on the fourth signal pattern. Therefore, the printing apparatus can prevent excessive heat storage in the heat-generating elements and can perform color development having high color developability by performing printing using the third signal pattern.

In the first aspect, in a case where the processor generates the third signal pattern, the processor may be configured to perform subtraction processing of reducing a ratio of the application information with respect to the non-application information, on the application information of a part of the first signal pattern or the second signal pattern in which the application information is subtracted, to generate the fourth signal pattern. The processor can easily generate the fourth signal pattern by performing the subtraction processing of reducing the ratio of the application information on the pattern as the subtraction source of the application information. Then, the third signal pattern is generated by a simple logical sum of the fourth signal pattern and a pattern for which the application information has not been subtracted. Therefore, the processor can easily generate the third signal pattern. Therefore, the printing apparatus can prevent excessive heat storage in the heat-generating elements and can perform color development having high color developability by performing printing using the third signal pattern.

In the first aspect, in a case where the processor generates the third signal pattern, the processor may be configured to perform subtraction processing of reducing a ratio of the application information with respect to the non-application information, on the application information of a part of the fourth signal pattern in which the application information is subtracted, to generate the third signal pattern. The processor can easily generate the third signal pattern by performing the subtraction processing of reducing the ratio of the application information in the fourth signal pattern. Therefore, the printing apparatus can prevent excessive heat storage in the heat-generating elements and can perform color development having high color developability by performing printing using the third signal pattern.

According to a second aspect of the present disclosure, there is provided a printing method of, in a printing apparatus including a thermal head having a plurality of heat-generating elements aligned in a line form and a conveyor configured to convey a print medium, which includes, at least, a first color development layer configured to develop a first color due to energy applied from the heat-generating elements, and a second color development layer having a color development characteristic different from that of the first color development layer and configured to develop a second color due to energy applied from the heat-generating elements, in a conveying direction orthogonal to a serial direction in which the plurality of heat-generating elements are aligned in the thermal head, the printing apparatus being configured to form print dots on the print medium conveyed by the conveyor, the printing method including the steps of:

generating a signal pattern for causing the plurality of heat-generating elements to selectively generate heat based on image data; controlling an application of energy to the heat-generating elements according to the signal pattern, for each printing cycle that is repeated continuously, in which the signal pattern is configured by a pattern in which application information of indicating a period for applying energy to the heat-generating elements and non-application information of indicating a period not for applying energy to the heat-generating elements are combined, in which the processor is configured to generate the signal pattern by a combination of: a first signal pattern that is used in a case of causing the first color development layer singly to develop a color to form a print dot of the first color; a second signal pattern that is used in a case of causing the second color development layer singly to develop a color to form a print dot of the second color; and a third signal pattern that is used in a case of causing each of the first color development layer and the second color development layer to develop each color to form a print dot of a mixed color of the first color and the second color, in which the third signal pattern is configured based on a logical sum of the first signal pattern and the second signal pattern, and is a pattern for applying a smaller amount of energy to the heat-generating elements than an amount of energy to be applied to the heat-generating elements according to a pattern configured by a mere logical sum of the first signal pattern and the second signal pattern. Therefore, the second aspect exhibits the similar effects to those of the first aspect.

According to a third aspect of the present disclosure, there is provided a non-transitory computer-readable storage medium storing a printing program executable by a computer of a printing apparatus that includes a thermal head having a plurality of heat-generating elements aligned in a line form, and a conveyor configured to convey a print medium, which includes at least a first color development layer configured to develop a first color due to energy applied from the heat-generating elements, and a second color development layer having a color development characteristic different from that of the first color development layer and configured to develop a second color due to energy applied from the heat-generating elements, in a conveying direction orthogonal to a serial direction in which the plurality of heat-generating elements are aligned in the thermal head, the printing apparatus being configured to form print dots on the print medium conveyed by the conveyor, the printing program comprising instructions that, when executed by the computer, cause the printing apparatus to perform: generating a signal pattern for causing the plurality of heat-generating elements to selectively generate heat based on image data; and controlling an application of energy to the heat-generating elements according to the signal pattern, for each printing cycle that is repeated continuously, in which the signal pattern is configured by a pattern in which application information of indicating a period for applying energy to the heat-generating elements and non-application information of indicating a period not for applying energy to the heat-generating elements are combined, in which the processor is configured to generate the signal pattern by a combination of: a first signal pattern that is used in a case of causing the first color development layer singly to develop a color to form a print dot of the first color; a second signal pattern that is used in a case of causing the second color development layer singly to develop a color to form a print dot of the second color; and a third signal pattern that is used in a case of causing each of the first color development layer and the second color development layer to develop each color to form a print dot of a mixed color of the first color and the second color, and in which the third signal pattern is configured based on a logical sum of the first signal pattern and the second signal pattern, and is a pattern for applying a smaller amount of energy to the heat-generating elements than an amount of energy to be applied to the heat-generating elements according to a pattern configured by a mere logical sum of the first signal pattern and the second signal pattern. Therefore, the third aspect exhibits the similar effects to those of the first aspect.

Hereinafter, an embodiment of the present disclosure will be described with reference to the drawings. The drawings that will be referred to are used so as to describe the technical features that can be adopted by the present disclosure, and the configurations and control and the like of the apparatus described below are not intended to be limited thereto but are merely explanatory examples.

A printing apparatus 1 of the present embodiment is a label printer configured to prepare an attachable label by printing a character, a symbol, a figure, an image, etc. on a heat-sensitive tape 9 (refer to FIG. 3), which is a long-length print medium in which a release sheet is attached to one side via an adhesive layer, and cutting the tape. The heat-sensitive tape 9 is accommodated in a cassette (not shown) in a state of being wound into a roll shape, and is mounted to the printing apparatus 1.

Figure 1:
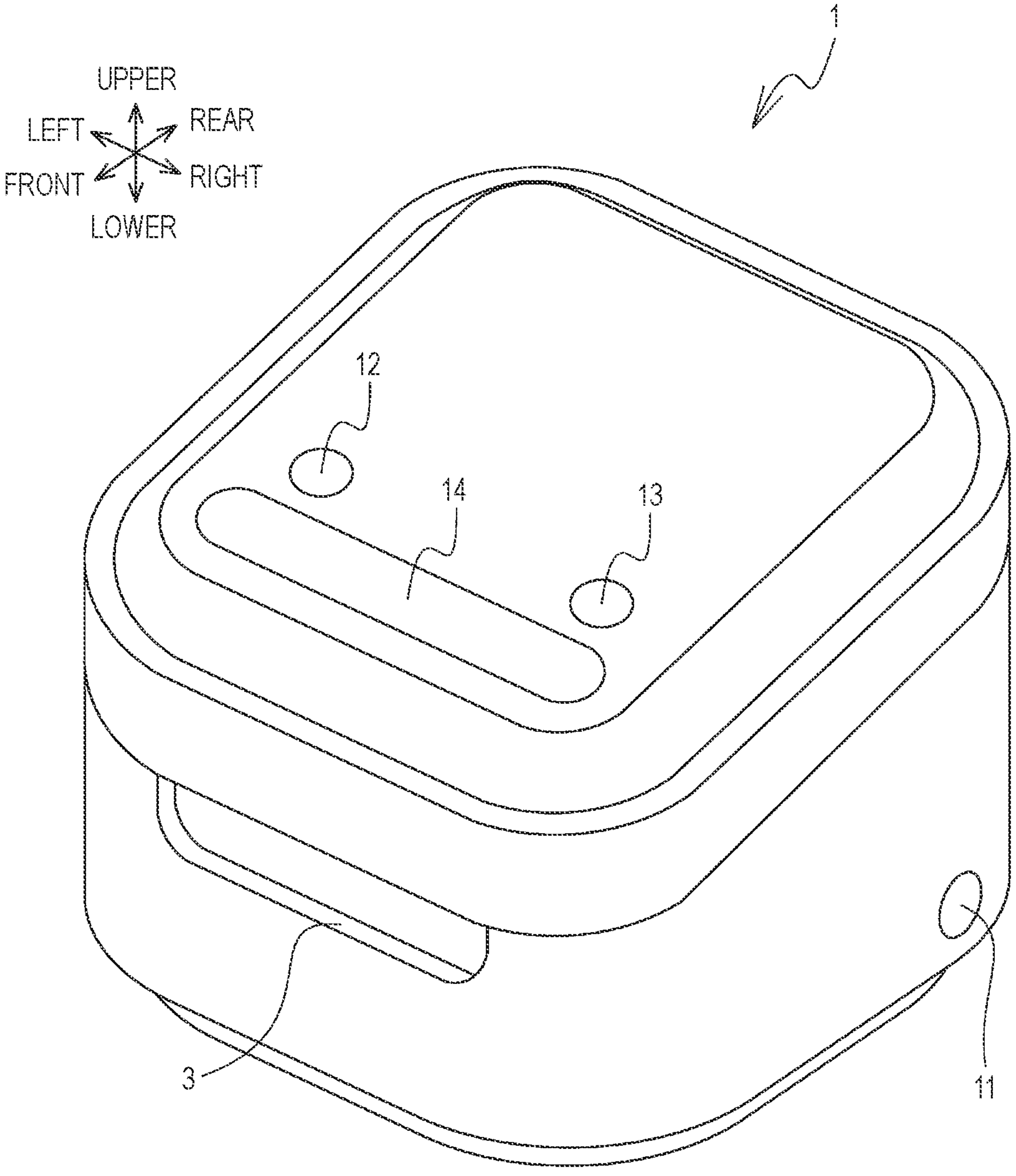
FIG. 1 is a perspective view showing an appearance of a printing apparatus 1.

An outer configuration of the printing apparatus 1 will be described. As shown in FIG. 1, the printing apparatus 1 has a box shape, and a mounting part (not shown) for mounting the cassette of the heat-sensitive tape 9 is provided on a back side. A front side of the printing apparatus 1 is provided with a discharge port 3 for discharging a printed label. A power supply switch 11 is provided on a rear lower part of a right side surface of the printing apparatus 1. An upper surface of the printing apparatus 1 is provided with a connection switch 12 for instructing network connection, a cassette switch 13 for instructing removal of the cassette, and a cutting switch 14 for instructing cutting of the heat-sensitive tape 9. Note that the power switch 11, the connection switch 12, the cassette switch 13, and the cutting switch 14 are also generally referred to as switches 11 to 14.

Figure 2:
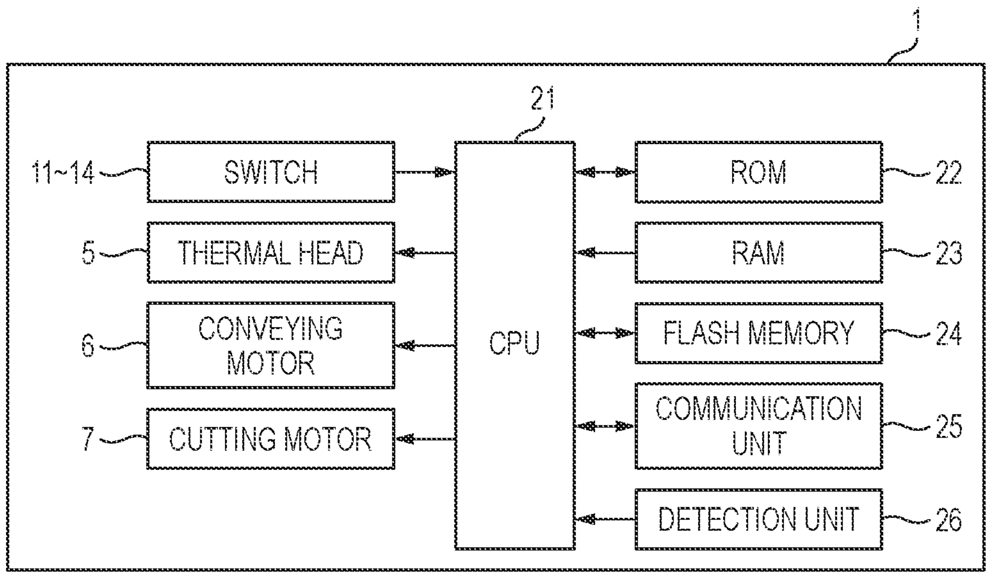
FIG. 2 is a block diagram showing an electrical configuration of the printing apparatus 1.

An electrical configuration of the printing apparatus 1 will be described. As shown in FIG. 2, the printing apparatus 1 includes a CPU 21. The CPU 21 is configured to control the printing apparatus 1 and to function as a processor. A ROM 22, a RAM 23, a flash memory 24, a communication unit 25, a detection unit 26, switches 11 to 14, a thermal head 5, a conveying motor 6, and a cutting motor 7 are electrically connected to the CPU 21.

The ROM 22 is configured to store various parameters necessary for execution of various programs. The RAM 23 is configured to store various temporary data, such as image data corresponding to each pixel area for original image to be printed, and print data generated based on image data for forming an image. The flash memory 24 is configured to store programs to be executed by the CPU 21, information on a cassette, and the like. The communication unit 25 is a well-known wireless LAN interface, and is configured to communicate by connecting to an external terminal (not shown). The communication unit 25 may be a USB interface or a wired LAN interface. The external terminal is, for example, a general-purpose personal computer (PC), a portable terminal, a memory card reading device, or the like.

The detection unit 26 is a known sensor configured to detect a type of the heat-sensitive tape 9 mounted to the printing apparatus 1, based on an identifier provided to the cassette. The switches 11 to 13 are push button-type switches. The power supply switch 11 is operated when a user switches ON/OFF of power supply to the printing apparatus 1. The connection switch 12 is operated by the user when connecting to the network by wireless LAN. The cassette switch 13 is operated by the user when removing the cassette of the heat-sensitive tape 9 mounted to the mounting part. The cutting switch 14 is a touch sensor. The cutting switch 14 is operated when the user cuts the heat-sensitive tape 9 to an arbitrary length.

The thermal head 5 includes a plurality of heat-generating elements (not shown). The heat-generating elements are aligned and arranged in a left-right direction within the printing apparatus 1. The heat-sensitive tape 9 is taken out from the cassette mounted to the mounting part, conveyed from the rear toward the front within the printing apparatus 1, and discharged from the discharge port 3. The plurality of heat-generating elements of the thermal head 5 are aligned in a row in the left-right direction orthogonal to a conveying direction of the heat-sensitive tape 9, and are configured to heat the heat-sensitive tape 9. The conveying motor 6 is configured to rotationally drive a platen roller (not shown) arranged to face the thermal head 5, thereby conveying the heat-sensitive tape 9 in the conveying direction. The cutting motor 7 is configured to drive a cutting blade (not shown) provided near the discharge port 3, thereby cutting the heat-sensitive tape 9 to prepare a label.

Figure 3:
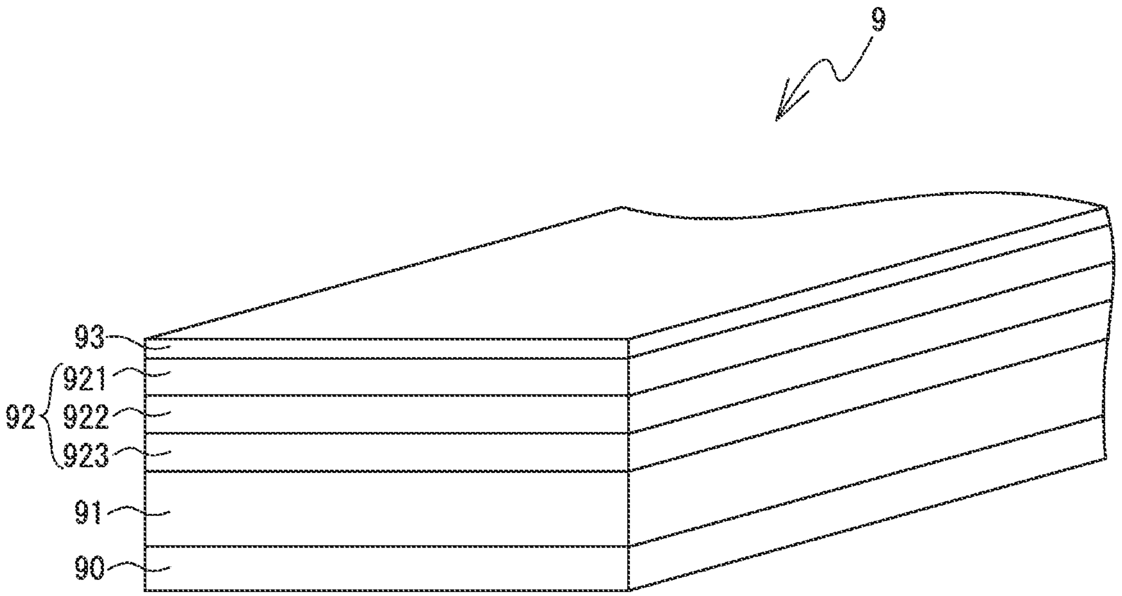
FIG. 3 is a perspective view showing a heat-sensitive tape 9.

A configuration of the heat-sensitive tape 9 will be described. In the following description, the upper and lower sides of FIG. 3 are respectively referred to as the upper and lower sides of each tape. The heat-sensitive tape 9 is a long-length medium and is configured by laminating a plurality of layers. The heat-sensitive tape 9 includes a release sheet 90, a base material 91, a plurality of heat-sensitive layers 92, and an overcoat layer 93 (hereinafter collectively referred to as "each layer of the heat-sensitive tape 9"). In the present embodiment, the plurality of heat-sensitive layers 92 include a first heat-sensitive layer 921, a second heat-sensitive layer 922, and a third heat-sensitive layer 923. The release sheet 90, the base material 91, the third heat-sensitive layer 923, the second heat-sensitive layer 922, the first heat-sensitive layer 921, and the overcoat layer 93 are aligned and laminated in this order in a thickness direction (upper-lower direction in FIG. 3) of the heat-sensitive tape 9 from the lower side of the heat-sensitive tape 9.

The release sheet 90 is provided to be able to contact/separate with respect to a lower surface of the base material 91, and protects an adhesive of the base material 91. By separating the release sheet 90 after printing, the user can stick the label prepared by cutting the heat-sensitive tape 9 to a desired location via the adhesive. The heat-sensitive tape 9 may also be a heat-sensitive sheet with no adhesive applied to a back side of the base material 91.

The base material 91 is a resin film, specifically a non-foamed resin film, and more specifically a non-foamed polyethylene terephthalate (PET) film. That is, an inside of the base material 91 does not contain air bubbles.

Each layer of the plurality of heat-sensitive layers 92 is configured to develop each color corresponding to each layer by being heated to a color development temperature corresponding to each layer. For the formation of the plurality of heat-sensitive layers 92, a chemical described in, for example, JP2008-006830A is used. When the third heat-sensitive layer 923 is heated at a temperature exceeding a third temperature for a third time or longer, it develops a third color having lower visible transmittance than an original state thereof. In the present embodiment, the third color is cyan (hereinafter abbreviated as "C"). When the second heat-sensitive layer 922 is heated at a temperature exceeding a second temperature for a second time or longer, it develops a second color having lower visible transmittance than an original state thereof. The second temperature is higher than the third temperature. The second time is shorter than the third time. In the present embodiment, the second color is magenta (hereinafter abbreviated as "M"). When the first heat-sensitive layer 921 is heated at a temperature exceeding a first temperature for a first time or longer, it develops a first color having lower visible transmittance than an original state thereof. The first temperature is higher than the second temperature. The first time is shorter than the second time. In the present embodiment, the first color is yellow (hereinafter abbreviated as "Y").

As shown in FIG. 3, the overcoat layer 93 is formed in the form of a film by being coated on an upper surface of the first heat-sensitive layer 921, and is configured to transmit blue visible light (for example, light having a wavelength of about 470 nm) more than yellow visible light (for example, light having a wavelength of about 580 nm). That is, the overcoat layer 44 has lower visible light transmittance for yellow than visible light transmittance for blue. The overcoat layer 93 protects the plurality of heat-sensitive layers 92 from a side opposite to the base material 91 (i.e., upper surface side of the heat-sensitive tape 9).

The heat-sensitive tape 9 has visible light transmittance in the thickness direction of the heat-sensitive tape 9, as a whole. That is, all layers of the heat-sensitive tape 9 have visible light transmittance. The visible light transmittance (%) of the base material 91 may be the same as or different from the visible light transmittance of at least one of the plurality of heat-sensitive layers 92 or the overcoat layer 93. The visible light transmittance of each layer of the heat-sensitive tape 9 is, for example, 90% or greater, preferably 99% or greater, and more preferably 99.9% or greater. Even though the visible light transmittance of each layer of the heat-sensitive tape 9 is less than 90%, the visible light transmittance of each layer of the heat-sensitive tape 9 is only necessary to be high for the user to visualize at least colors developed in the heat-sensitive layers 92 through the base material 41. The layers of the heat-sensitive tape 9 are all transparent or translucent, and preferably transparent.

Note that, in FIG. 3, the thickness of each layer of the heat-sensitive tape 9 and the magnitude relationship among the thicknesses of the layers are depicted schematically to facilitate understanding, though the actual layer thicknesses and magnitude relationships among these thicknesses may differ from those shown in FIG. 3. For example, the thickness of the overcoat layer 93 may be greater, the same as or smaller than the thickness of each layer of the plurality of heat-sensitive layers 92.

The color development of the heat-sensitive layer 92 will be described. As described above, when the first heat-sensitive layer 921, the second heat-sensitive layer 922, and the third heat-sensitive layer 923 are heated to the first temperature or higher, the second temperature or higher, and the third temperature or higher, respectively, they develop colors of yellow, magenta and cyan, respectively. The CPU 21 of the printing apparatus 1 is configured to generate print data in which an energization pattern for each print dot to be formed on the heat-sensitive layer 92 is set based on an energization pattern table (refer to FIG. 4), in label preparation processing described later (refer to FIG. 7). In the energization pattern, an energization timing and an energization time to the heat-generating elements of the thermal head 5 are set so as to heat the heat-sensitive layer 92 to a temperature corresponding to a color of each print dot. The heat-generating elements are configured to generate heat when energized and to dissipate heat in a non-energization state. In the heat-sensitive layer 92, the first heat-sensitive layer 921, the second heat-sensitive layer 922, and the third heat-sensitive layer 923 are arranged in corresponding order from a side close to the heat-generating elements during printing. When the heat-generating elements heat the heat-sensitive layer 92, a temperature gradient in which the first heat-sensitive layer 921 side is high and the third heat-sensitive layer 923 side is low occurs among the first heat-sensitive layer 921, the second heat-sensitive layer 922, and the third heat-sensitive layer 923.

Figure 4:
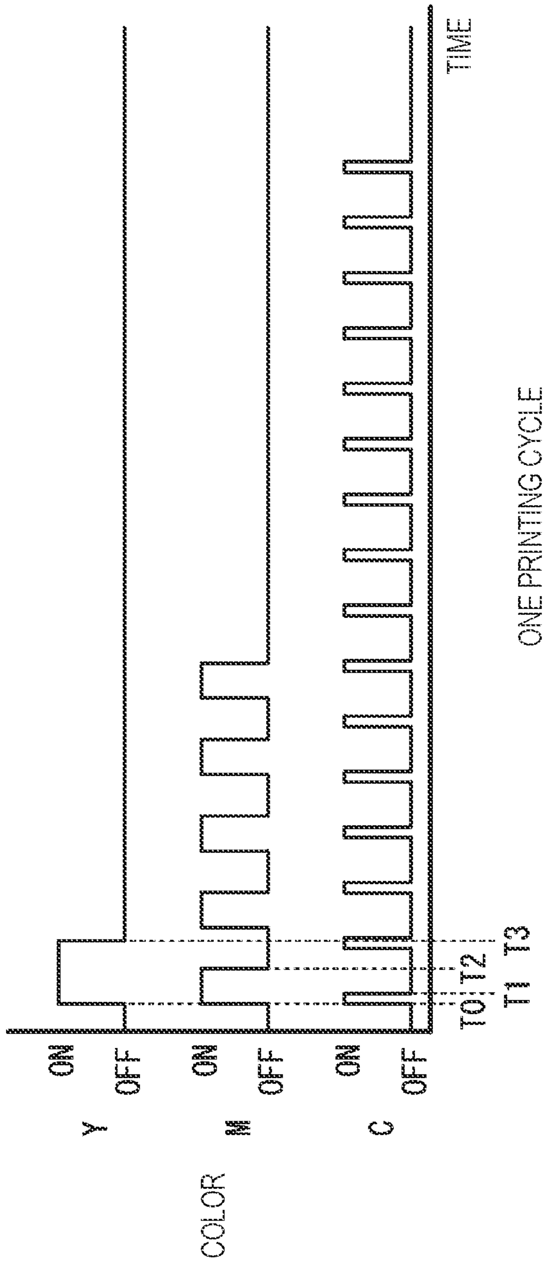
FIG. 4 is a timing chart showing an example of an energization pattern for a heat-generating element.

The energization pattern table is a table in which a relationship among a color, an energization timing, and an energization time in one printing cycle are mapped as an energization pattern, and is stored in the ROM 22. FIG. 4 is a timing chart showing the energization pattern table for illustration. The energization pattern table of the present embodiment stores energization patterns for forming print dots on only one heat-sensitive layer 92 of the plurality of heat-sensitive layers 92. That is, the energization pattern table stores yellow, magenta, and cyan energization patterns.

While conveying the heat-sensitive tape 9 in the conveying direction, the printing apparatus 1 heats the heat-sensitive tape 9 by the heat-generating elements aligned in a row of the thermal heads 5 to form print dots row by row. The printing cycle is a period of time during which print dots of one row are formed by the heat-generating elements while the heat-sensitive tape 9 is conveyed in the conveying direction. The printing apparatus 1 heats the heat-sensitive tape 9 by the heat-generating elements according to an energization pattern at every printing cycle when forming a plurality of rows of print dots.

As shown in FIG. 4, in a yellow (Y) energization pattern, the energization state continues after the energization is started (ON) at TO until the energization is stopped (OFF) at T3. When the heat-sensitive layer 92 is heated to a temperature higher than the first temperature by the heat applied by the heat-generating elements and maintained at the temperature higher than the first temperature for the first time or longer, the first heat-sensitive layer 921 develops the color of yellow. The heat applied by the heat-generating elements heats the second heat-sensitive layer 922. Even though the second heat-sensitive layer 922 is heated to a temperature higher than the second temperature, the second heat-sensitive layer 922 does not develop a color if the heating time at that temperature is shorter than a second time longer than the first time. The heat applied by the heat-generating elements further heats the third heat-sensitive layer 923. Even though the third heat-sensitive layer 923 is heated to a temperature higher than the third temperature, the third heat-sensitive layer 923 does not develop a color if the heating time at that temperature is shorter than a third time longer than the second time. If the energization is continued as it is, the heating time at the first temperature for the heat-sensitive layer 92 exceeds the second time, but ends at T6 before reaching the second time. Therefore, in the heat-sensitive layer 92, only the yellow of the first heat-sensitive layer 921 is developed by the energization according to the Y energization pattern.

In a magenta (M) energization pattern, after energization is started at TO, the energization is stopped at T2 before T3, and then the energization for the same period with the term T0 to T2 is repeated four times at regular intervals. By chopper control in which the short-period energization from T0 to T2 is repeated, the heat-generating elements heat the heat-sensitive layer 92 to a temperature higher than the second temperature and equal to or lower than the first temperature, and maintains the state for the second time or longer. This causes the second heat-sensitive layer 922 to develop a color of magenta. The heat-generating elements heat the first heat-sensitive layer 921, but the first heat-sensitive layer 921 does not develop a color because the first heat-sensitive layer is maintained at the first temperature or lower. In addition, the heat-generating elements also heat the third heat-sensitive layer 923, but the third heat-sensitive layer 923 does not develop a color because the heating time at the temperature higher than the third temperature is shorter than the third time. Therefore, in the heat-sensitive layer 92, only magenta of the second heat-sensitive layer 922 is developed by the energization according to the M energization pattern.

In a cyan (C) energization pattern, after energization is started at TO, the energization is stopped at T1 before T3, and then, the energization for the same time as the time ranging from T0 to T1 is repeated 15 times at regular intervals. Each energization interval is longer than that of the M energization pattern. The temperature of the heat-sensitive layer 92 is maintained at a temperature higher than the third temperature and equal to or lower than the second temperature for the third time or longer by chopper control in which energization for an extremely short time shorter than that of the M energization pattern is repeated multiple times. This causes the third heat-sensitive layer 923 to develop a color of cyan. The heat-generating elements heat the first heat-sensitive layer 921 and the second heat-sensitive layer 922, but the first heat-sensitive layer 921 and the second heat-sensitive layer 922 do not develop colors because they are maintained at the second temperature or lower. Therefore, in the heat-sensitive layer 92, only cyan of the third heat-sensitive layer 923 is developed by the energization according to the C energization pattern.

The heat-sensitive layer 92 can develop a mixed color by developing colors in two or more of the three layers. The heat-sensitive layer 92 develops red (hereinafter, abbreviated as "R"), which is a mixed color of Y and M, green (hereinafter, abbreviated as "G"), which is a mixed color of C and Y, blue (hereinafter, abbreviated as "B"), which is a mixed color of C and M, and black (hereinafter, abbreviated as "K"), which is a mixed color of C, M and Y. Energization patterns for representing red, blue, green, or black are not stored in the energization pattern table, but are generated in each case by calculating logical sums of the yellow, magenta, and cyan energization patterns at the time of printing.

The red (R) energization pattern is generated by calculating a logical sum of the yellow energization pattern and the magenta energization pattern. There are a plurality of types of generation methods, which are set in advance according to types and color development characteristics of the heat-sensitive tape 9. Note that, as described above, in the magenta energization pattern, the short-period energization is repeated by chopper control, so that the temperature of the heat-sensitive layer 92 is maintained at a temperature higher than the second temperature and equal to or lower than the first temperature for the second time or longer. In addition, in the yellow energization pattern, the temperature of the heat-sensitive layer 92 is maintained at a temperature higher than the first temperature for the first time or longer. For this reason, if the red energization pattern is generated by simply calculating a logical sum of the yellow energization pattern and the magenta energization pattern, there is a possibility that an amount of energy exceeding an amount of energy required for the color development of red will be applied to the heat-generating elements. In this case, in a state where the temperature of the heat-sensitive layer 92 is raised above the first temperature due to the heating derived from the yellow energization pattern, the heating derived from the magenta energization pattern is added to the heat-sensitive layer 92. The heat-sensitive layer 92 is maintained for the third time or longer in the state where the temperature of the heat-sensitive layer 92 is higher than the first temperature, so that cyan is developed to exhibit a mixed color of black. For this reason, in the present embodiment, an energization pattern obtained by subtracting a portion of the amount of energy from the energization pattern generated by the logical sum of the yellow energization pattern and the magenta energization pattern is generated as the red energization pattern.

Figure 5A:
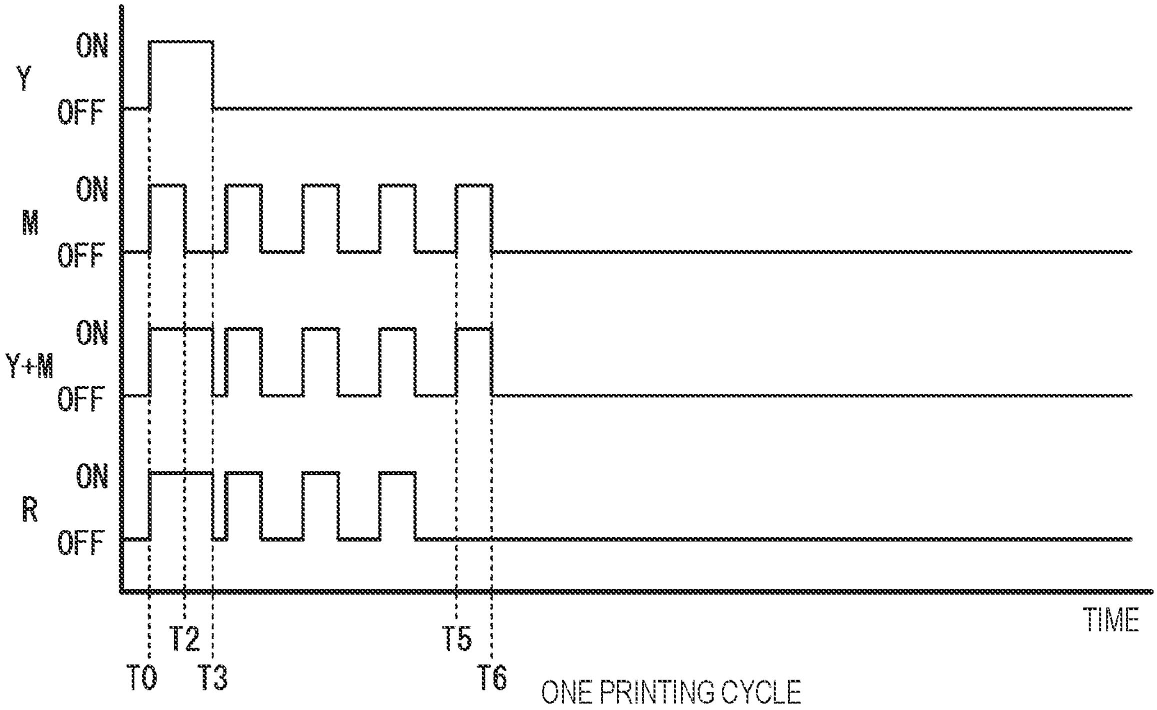
FIG. 5A is a diagram illustrating a first example in which a red energization pattern is generated from yellow and magenta energization patterns.

FIG. 5A shows a first generation method of a red energization pattern, the red being a mixed color of yellow and magenta. In the first generation method, a logical sum pattern of yellow and magenta (Y+M) is generated by a logical sum of the yellow (Y) energization pattern and the magenta (M) energization pattern. In an energization part derived from the M energization pattern, an energization part for a first time ranging from T0 to T2 in chopper control is included in a part derived from the Y energization pattern. In order to subtract a portion of an amount of energy from the Y+M logical sum pattern, in the first generation method, subtraction processing of reducing a number of chopping times in chopper control is performed. For example, among four choppings derived from the magenta energization pattern in the Y+M logical sum pattern, a fourth chopping performed for a time ranging from T5 to T6 is subtracted, so that the red (R) energization pattern is generated from the Y+M logical sum pattern. The part derived from the Y energization pattern is completed to form a print dot earlier than the part derived from the M energization pattern. In the first generation method, the amount of energy is subtracted from the part derived from the M energization pattern, which is a side where the configuration of the print dot is completed later.

Figure 5B:
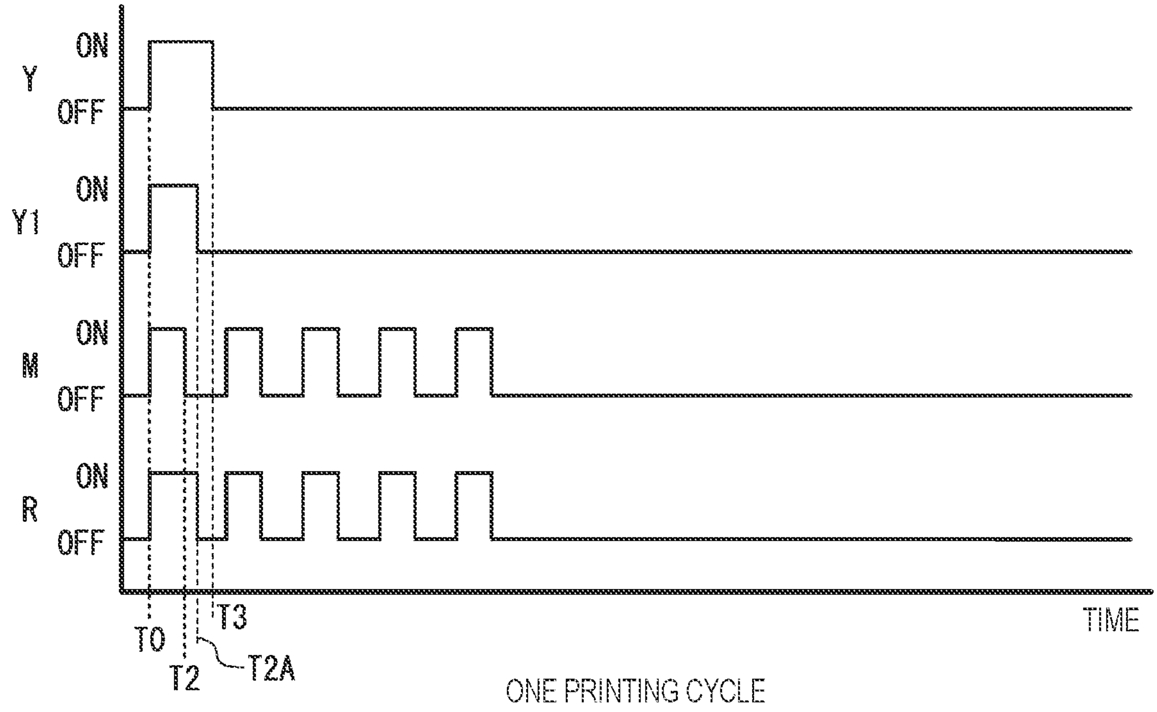
FIG. 5B is a diagram illustrating a second example in which a red energization pattern is generated from yellow and magenta energization patterns.

FIG. 5B shows a second generation method of a red energization pattern, the red being a mixed color of yellow and magenta. In the second generation method, a yellow (Y1) subtraction pattern is generated by subtracting an amount of energy from the yellow (Y) energization pattern. That is, a part derived from the Y energization pattern is subtracted to an energization time ranging from T0 to T2A in such a manner that an energization time ranging from T0 to T3 before subtraction is made shorter than the same. A red (R) energization pattern is generated by calculating a logical sum of the Y1 subtraction pattern and the magenta (M) energization pattern. The part derived from the Y energization pattern is completed to form a print dot earlier than the part derived from the M energization pattern. In the second generation method, the amount of energy is subtracted from the part derived from the Y energization pattern, which is a side where the configuration of the print dot is completed earlier.

Figure 6A:
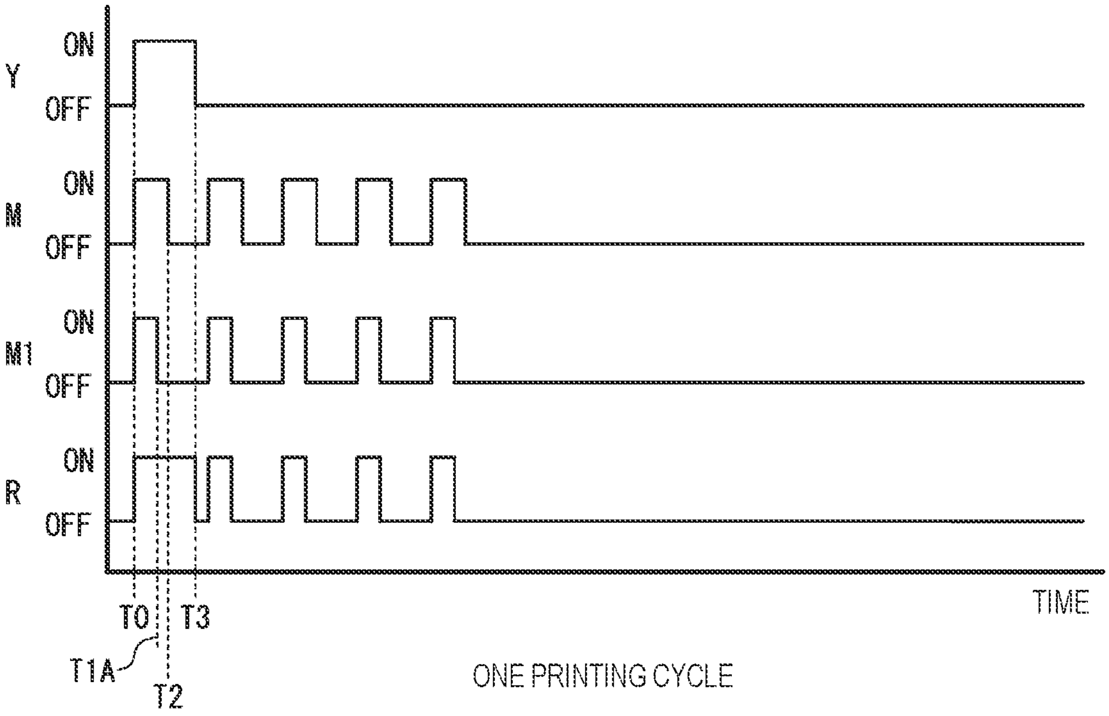
FIG. 6A is a diagram illustrating a third example in which the red energization pattern is generated from the yellow and magenta energization patterns.

FIG. 6A shows a third generation method of a red energization pattern, the red being a mixed color of yellow and magenta. In the third generation method, a magenta (M1) subtraction pattern is generated by subtracting an amount of energy from the magenta (M) energization pattern. That is, a part derived from the M energization pattern is subtracted to an energization time ranging from T0 to T1A in such a manner that each of five-time chopping portions is made shorter than an energization time ranging from T0 to T2 before subtraction. A red (R) energization pattern is generated by calculating a logical sum of the Y energization pattern and the magenta (M1) subtraction pattern. The part derived from the Y energization pattern is completed to form a print dot earlier than the part derived from the M energization pattern. In the third generation method, the amount of energy is subtracted from the part derived from the M energization pattern, which is a side where the configuration of the print dot is completed later.

Figure 6B:
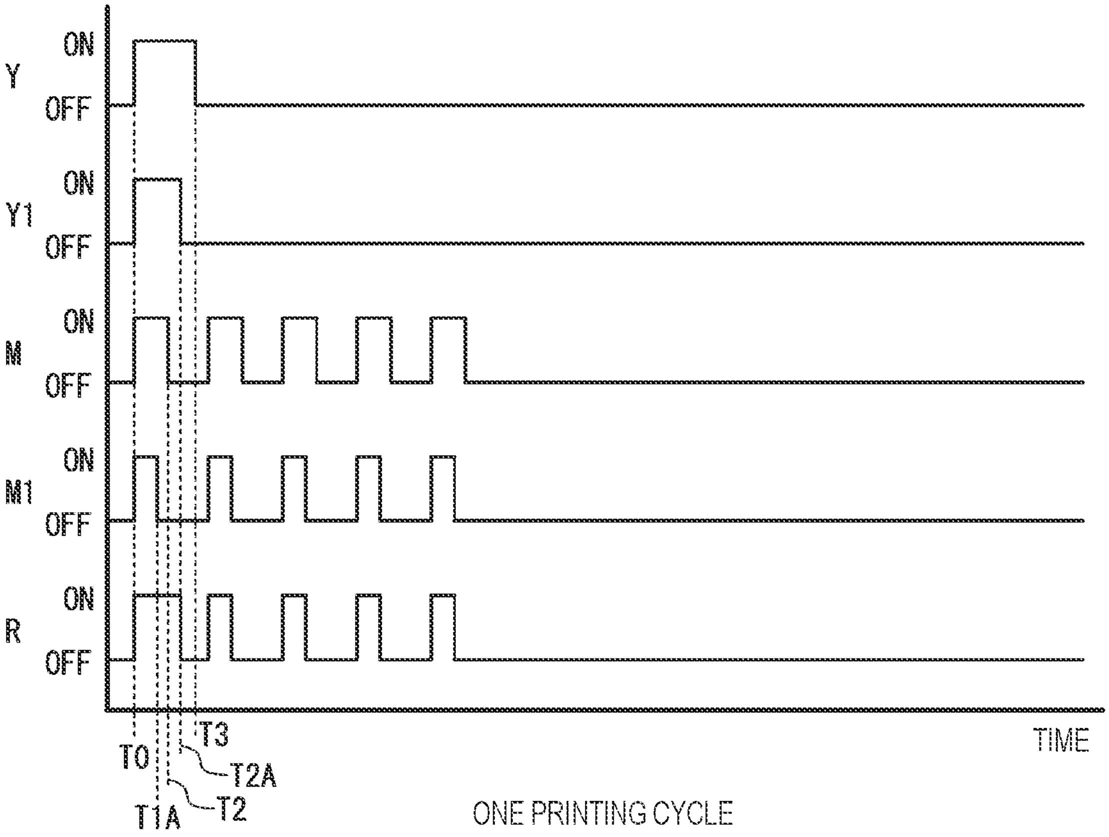
FIG. 6B is a diagram illustrating a fourth example in which the red energization pattern is generated from the yellow and magenta energization patterns.

FIG. 6B shows a fourth generation method of a red energization pattern, the red being a mixed color of yellow and magenta. In the fourth generation method, a yellow (Y1) subtraction pattern and a magenta (M1) subtraction pattern are generated by subtracting an amount of energy amount from both the yellow (Y) energization pattern and the magenta (M) energization pattern. That is, a part derived from the Y energization pattern is subtracted to an energization time ranging from T0 to T2A in such a manner that an energization time ranging from T0 to T3 before subtraction is made shorter than the same. In addition, a part derived from the M energization pattern is subtracted to an energization time ranging from T0 to T1A in such a manner that each of five-time chopping portions is made shorter than an energization time ranging from T0 to T2 before subtraction. A red (R) energization pattern is generated by calculating a logical sum of the Y1 subtraction pattern and the M1 subtraction pattern.

In this way, the R energization pattern is an energization pattern obtained by subtracting a portion of the amount of energy from the logical sum pattern obtained by calculating the logical sum of the Y energization pattern and the M energization pattern of M, from the part derived from the Y energization pattern, from the part derived from the M energization pattern, or from both the parts. The R energization pattern maintains the heat-sensitive layer 92 at a temperature exceeding the first temperature for the second time or longer. This causes the first heat-sensitive layer 921 to develop the color of yellow and the second heat-sensitive layer 922 to develop the color of magenta. The heat-generating elements also heat the third heat-sensitive layer 923, but the third heat-sensitive layer 923 does not develop a color because the heating time is shorter than the third time even though the temperature is higher than the third temperature. For this reason, the heat-sensitive layer 92 develops yellow of the first heat-sensitive layer 921 and magenta of the second heat-sensitive layer 922 by the energization according to the R energization pattern, thereby exhibiting red as a mixed color.

A blue (B) energization pattern is generated by calculating a logical sum of the magenta energization pattern and the cyan energization pattern, and subtracting a portion of an amount of energy. The generation method is similar to the red energization pattern, and therefore, the description thereof is omitted. The temperature of the heat-sensitive layer 92 exceeds the second temperature but is maintained at a temperature equal to or lower than the first temperature for the third time or more. This causes the second heat-sensitive layer 922 to develop the color of magenta and the third heat-sensitive layer 923 to develop the color of cyan. The heat-generating elements also heat the first heat-sensitive layer 921, but the first heat-sensitive layer 921 does not develop a color because the first heat-sensitive layer is maintained at the first temperature or lower. For this reason, the heat-sensitive layer 92 develops magenta of the second heat-sensitive layer 922 and cyan of the third heat-sensitive layer 923 by the energization according to the B energization pattern, thereby exhibiting blue as a mixed color.

A green (G) energization pattern is generated by calculating a logical sum of the yellow energization pattern and the cyan energization pattern, and subtracting a portion of an amount of energy. In the G energization pattern, after the part derived from the yellow energization pattern, a period of non-energization to the heat-generating elements is inserted in order to lower the temperature of the heat-sensitive layer 92, which is higher than the first temperature, to the second temperature or lower. The generation method in other parts is similar to the red energization pattern, and therefore, the description thereof is omitted. The energization of the part derived from the yellow energization pattern maintains the heat-sensitive layer 92 at a temperature exceeding the first temperature for the first time or longer. This causes the first heat-sensitive layer 921 to develop the color of yellow. The second heat-sensitive layer 922 and the third heat-sensitive layer 923 do not develop colors. For a while thereafter, the energization to the heat-generating elements is not performed, and the temperature of the heat-sensitive layer 92 is dropped to the second temperature or lower. Then, chopper control in which energization for an extremely short time by the part derived from the cyan energization pattern is repeated is performed, the heat-generating elements heat the temperature of the heat-sensitive layer 92 to a temperature higher than the third temperature and equal to or lower than the second temperature, and maintains the state for the third time or longer. This causes the third heat-sensitive layer 923 to develop a color of cyan. During this energization, the second heat-sensitive layer 922 does not develop a color. For this reason, the heat-sensitive layer 92 develops yellow of the first heat-sensitive layer 921 and cyan of the third heat-sensitive layer 923 by the energization according to the G energization pattern, thereby exhibiting green as a mixed color.

A black (K) energization pattern is generated by calculating a logical sum of the yellow energization pattern, the magenta energization pattern, and the cyan energization pattern, and subtracting a portion of an amount of energy. The generation method is similar to the red energization pattern, and therefore, the description thereof is omitted. The heat-generating elements heat the temperature of the heat-sensitive layer 92 to a temperature higher than the first temperature and maintains the temperature for the third time or longer. Thereby, in each of the first heat-sensitive layer 921, the second heat-sensitive layer 922, and the third heat-sensitive layer 923, yellow, magenta, and cyan are developed, and black is exhibited as a mixed color.

An energization pattern other than the above patterns may also be provided. For example, a pattern in which cyan is first developed, or a pattern in which the energization start timing is delayed may be provided, as the black energization pattern.

Next, label preparation processing by the printing apparatus 1 will be described. The user operates an external terminal to transmit a print start instruction to the printing apparatus 1. When the print start instruction is acquired, the CPU 21 reads out a program from the flash memory 24 and executes label preparation processing. In the label preparation processing, a printing operation by the printing apparatus 1 is controlled, and a label is prepared from the printed heat-sensitive tape 9.

Figure 7:
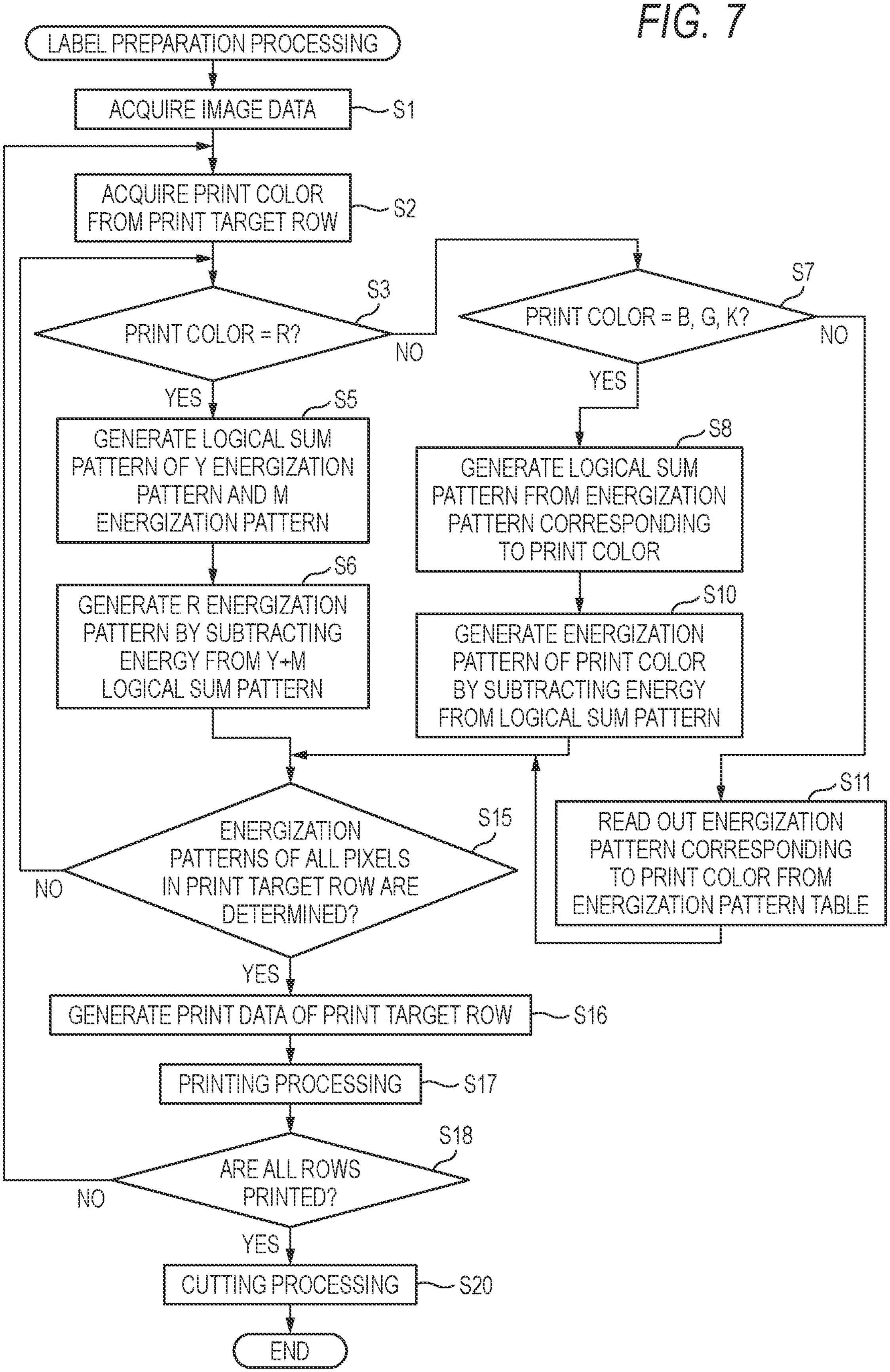
FIG. 7 is a flowchart of label preparation processing.

As shown in FIG. 7, the CPU 21 acquires image data representing an image designated by the user (S1). The image data is acquired from the user's external terminal via a network. Note that the image data may also be data read in advance from the external terminal and stored in the flash memory 24.

The CPU 21 executes processing of acquiring a print color from a print target row (S2). For the image data, the CPU 21 sets a plurality of pixels, which are aligned in a direction orthogonal to the conveying direction of the heat-sensitive tape 9, sequentially row by row as a print target, acquires a color of each pixel in the print target row, and converts the same into a color of a dot to be color-developed by the printing apparatus 1. The printing apparatus 1 causes the heat-sensitive layer 92 to develop respective colors of cyan, magenta, and yellow, and can further express respective colors of red, green, blue, and black, as mixed colors. The CPU 21 decomposes the color of each pixel of the image data, and performs color conversion for expressing each color described above.

The CPU 21 sequentially checks the print colors of the print target row one by one, and when the print color is R (S3: YES), the CPU reads the Y energization pattern and the M energization pattern from the energization pattern table. The CPU 21 calculates a logical sum of the Y energization pattern and the M energization pattern, and generates a Y+M logical sum pattern (S5). The CPU 21 generates an R energization pattern by subtracting a portion of an amount of energy, for example, reducing the number of chopping times from the Y+M logical sum pattern, as in the first generation method (S6). The CPU 21 stores the generated energization pattern in the RAM 23, and returns the processing to S3 when there is a pixel whose energization pattern has not been determined in the print target row (S15: NO).

When the print color is B, G, or K (S3: NO, S7: YES), the CPU 21 reads the energization patterns of colors necessary for mixing of the print color from the energization pattern table, similarly to the case of R. The CPU 21 calculates a logical sum of the read energization patterns and generates a logical sum pattern (S8). The CPU 21 generates a print color energization pattern by subtracting a portion of an amount of energy from the generated logical sum pattern (S10). The CPU 21 stores the generated energization pattern in the RAM 23, and returns the processing to S3 when there is a pixel whose energization pattern has not been determined in the print target row (S15: NO).

When the print color is Y, M, or C (S3: NO, S7: NO), the CPU 21 reads the energization pattern of the print color from the energization pattern table (S11). The CPU 21 stores the read energization pattern in the RAM 23. When the energization patterns of all the pixels in the print target row are determined (S15: YES), the CPU 21 prepares a command for controlling energization to the heat-generating elements corresponding to each print dot, based on the energization pattern for each print dot, according to a predetermined format, and generates print data of the print target row (S16).

The CPU 21 controls the thermal head 5 while controlling the conveying motor 6. The platen roller is rotationally driven to take out the heat-sensitive tape 9 from the cassette and to convey the same in the conveying direction. The CPU 21 executes each command of print data while conveying the heat-sensitive tape 9, and causes the plurality of heat-generating elements to selectively generate heat. The heat-sensitive layer 92 of the heat-sensitive tape 9 is heated from each the plurality of heat-generating elements of the thermal head 5, according to the energization pattern. This causes the heat-sensitive layer 92 to develop colors, so that print dots for one row are formed and printing on the heat-sensitive tape 9 is performed (S17).

When there is a row of pixels in the image data that has not been printed (S18: NO), the CPU 21 returns the processing to S2, sets a next print target row, and continues printing on the heat-sensitive tape 9. When the printing for all rows in the image data is completed (S18: YES), the CPU 21 drives the cutting blade to cut the heat-sensitive tape 9 by controlling the cutting motor 7 (S20). The printing apparatus 1 discharges the printed label from the discharge port 3. The CPU 21 ends the label preparation processing.

As described above, the CPU 21 can easily generate the R energization pattern for causing the first heat-sensitive layer 921 and the second heat-sensitive layer 922 to develop colors, respectively, based on the Y energization pattern and the M energization pattern. In addition, the R energization pattern has a smaller amount of energy that is applied to the heat-generating elements, as compared with the Y+M logical sum pattern configured by a mere logical sum of the Y energization pattern and the M energization pattern. For this reason, the CPU 21 can prevent excessive heat storage in the heat-generating elements even though the R energization pattern is configured based on the simple logical sum, and can generate the R energization pattern capable of color development having high color developability.

When generating the R energization pattern, the CPU 21 generates the M1 energization pattern obtained by subtracting the period of the energization state from the M energization pattern, as in the third generation method, for example, and does not subtract the Y energization pattern. Then, the R energization pattern is generated by a simple logical sum of the M1 energization pattern and the Y energization pattern. Therefore, the CPU 21 can easily generate the R energization pattern. In addition, in the R energization pattern, the Y print dot formed by the part derived from the Y energization pattern is completed to be formed earlier than the M print dot formed by the part derived from the M energization pattern. Therefore, the part derived from the M energization pattern is affected by the heat applied by the part derived from the Y energization pattern, but the period of an energization state is subtracted from the part derived from the M energization pattern. Therefore, the printing apparatus 1 can prevent excessive heat storage in the heat-generating elements and perform color development having high color developability by performing printing using the R energization pattern.

When generating the R energization pattern, the CPU 21 generates the Y1 energization pattern obtained by subtracting the period of the energization state from the Y energization pattern, as in the second generation method, for example, and does not subtract the M energization pattern. Then, the R energization pattern is generated by a simple logical sum of the Y1 energization pattern and the M energization pattern. Therefore, the CPU 21 can easily generate the R energization pattern. In addition, in the R energization pattern, the Y print dot formed by the part derived from the Y energization pattern is completed to be formed earlier than the M print dot formed by the part derived from the M energization pattern. Therefore, the part derived from the M energization pattern is affected by the heat applied by the part derived from the Y energization pattern, but the effect of the heat by the part derived from the Y energization pattern is mitigated by the subtraction of the period of an energization state. Therefore, the printing apparatus 1 can prevent excessive heat storage in the heat-generating elements and perform color development having high color developability by performing printing using the R energization pattern.

When generating the R energization pattern, the CPU 21 generates the Y+M logical sum pattern by the simple logical sum of the Y energization pattern and the M energization pattern, as in the first generation method, for example. Then, the R energization pattern is generated by subtracting the period of the energization state from the Y+M logical sum pattern. Therefore, the CPU 21 can easily generate the R energization pattern. Then, the printing apparatus 1 can prevent excessive heat storage in the heat-generating elements and perform color development having high color developability by performing printing using the R energization pattern.

For example, as in the first generation method, the CPU 21 can easily generate a subtraction pattern by performing subtraction processing of subtracting the number of chopping times from a pattern as a subtraction source in the period of the energization state. Then, the R energization pattern is generated by a simple logical sum of the subtraction pattern and a pattern in which the period of the energization state is not subtracted. Therefore, the CPU 21 can easily generate the R energization pattern. Therefore, the printing apparatus 1 can prevent excessive heat storage in the heat-generating elements and perform color development having high color developability by performing printing using the R energization pattern.

For example, as in the second and third generating methods, the CPU 21 can easily generate a subtraction pattern by performing processing of reducing a ratio of the period of the energization state, i.e., processing of subtraction processing of shortening the energization period on the pattern as the subtraction source in the period of the energization state. Then, the R energization pattern is generated by a simple logical sum of the subtraction pattern and a pattern in which the period of the energization state is not subtracted. Therefore, the CPU 21 can easily generate the R energization pattern. Therefore, the printing apparatus 1 can prevent excessive heat storage in the heat-generating elements and perform color development having high color developability by performing printing using the R energization pattern.

In the above embodiment, the left-right direction of the printing apparatus 1 corresponds to the “serial direction” of the present disclosure. The heat-sensitive tape 9 corresponds to the "print medium" of the present disclosure. The conveying motor 6 and the platen roller correspond to the "conveyor" of the present disclosure. The CPU 21 corresponds to the "processor" of the present disclosure. The energization state (ON) and the non-energization state (OFF) in the energization pattern correspond to "application information" and "non-application information" of the present disclosure. The heat-sensitive layer 92 corresponds to the "color development layer" of the present disclosure. The first heat-sensitive layer 921 and the second heat-sensitive layer 922 correspond to the "first color development layer", and "second color development layer" of the present disclosure, respectively. Yellow and magenta are examples of the "first color" and "second color" of the present disclosure, respectively. The Y energization pattern corresponds to the "first signal pattern" of the present disclosure. The M energization pattern corresponds to the "second signal pattern" of the present disclosure. The Y+M energization pattern corresponds to the "third signal pattern" of the present disclosure.

Figure 8:
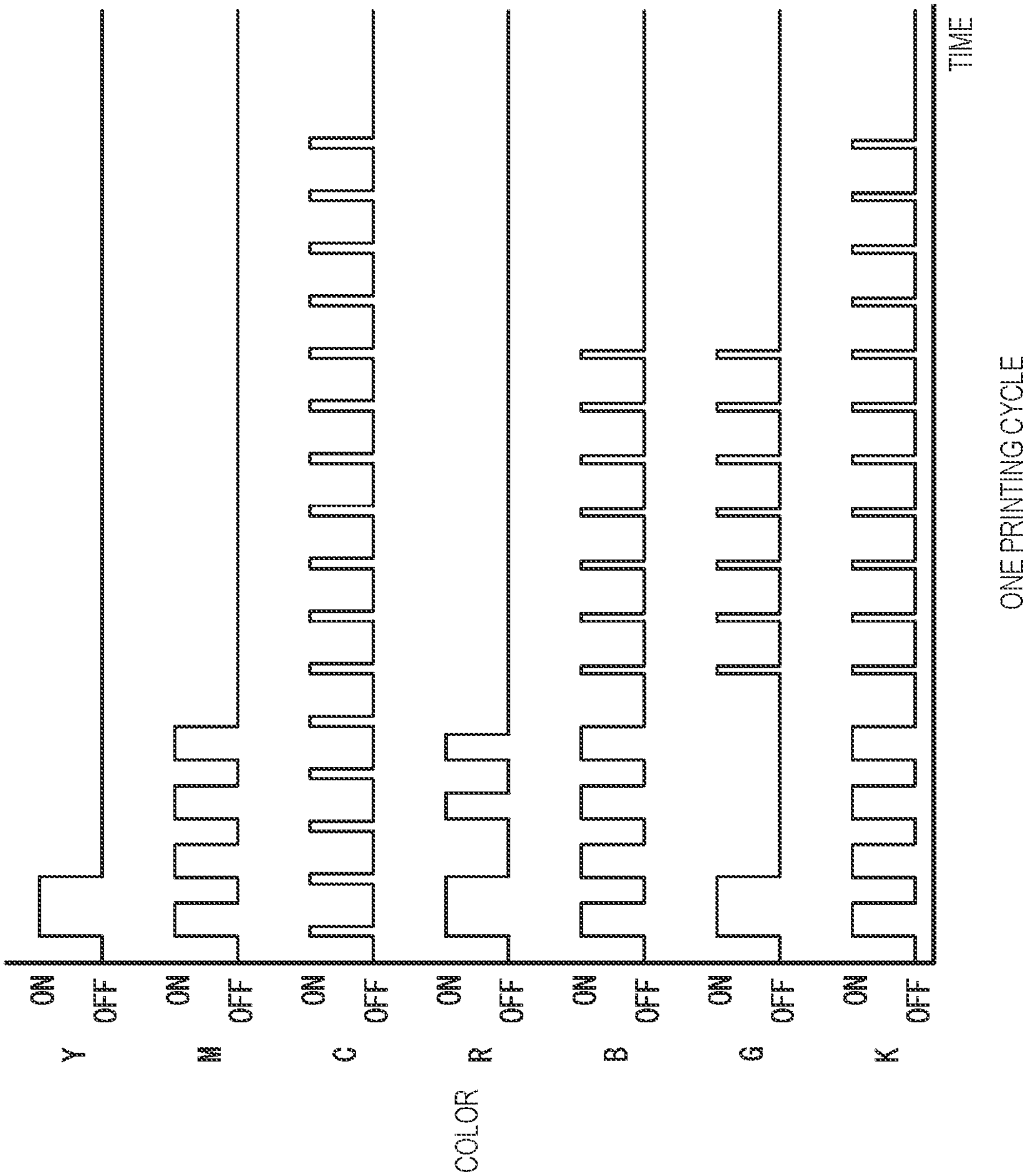
FIG. 8 is a timing chart showing an example of an energization pattern for a heat-generating element when a mixed color energization pattern is provided in advance.
Figure 9:
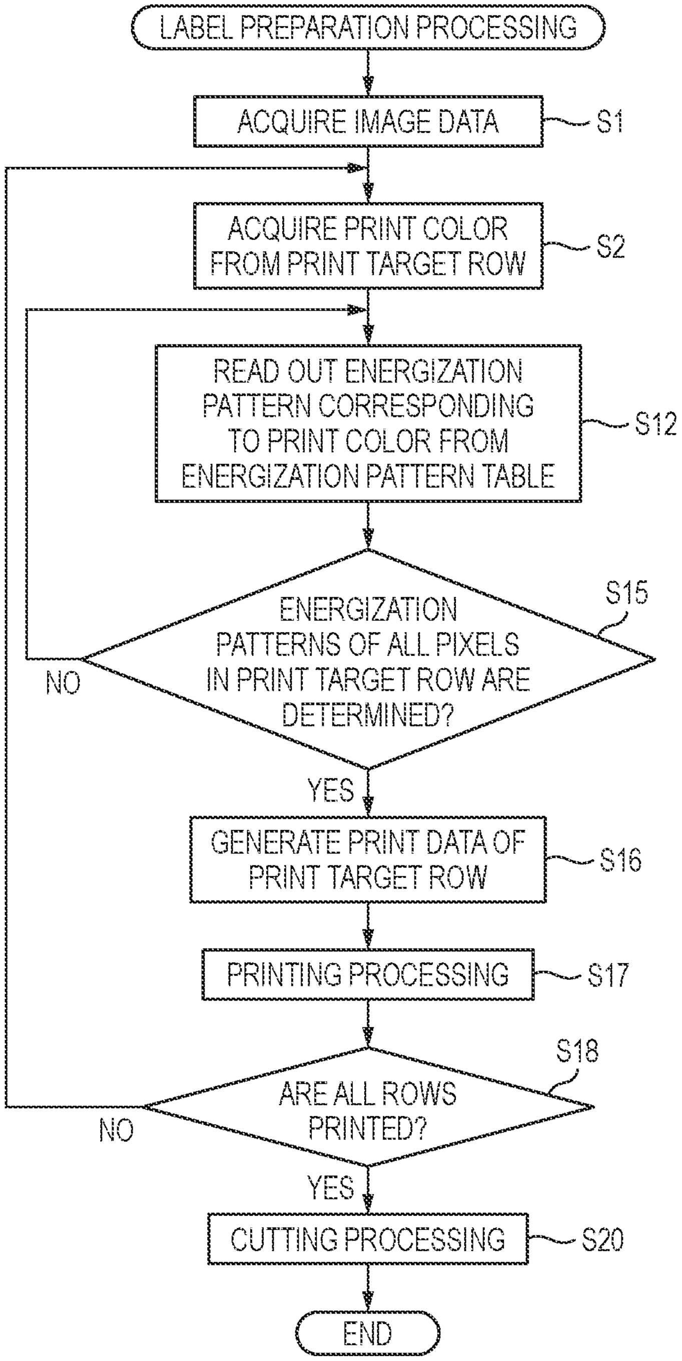
FIG. 9 is a flowchart of a modified embodiment of the label preparation processing when a mixed color energization pattern is provided in advance.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. For example, the energization pattern table is not limited to the above-described Y, M, and C energization patterns, and may have R, B, G, and K energization patterns in advance, as shown in FIG. 8. Note that the energization patterns of R, B, G, and K may be generated in advance by calculating the logical sum based on the energization patterns of Y, M, and C and subtracting the amount of energy according to the above procedure. In addition, for the R, B, G, and K energization patterns, different energization patterns may be generated by the first to fourth generation methods, respectively, and an appropriate energization pattern may be selected according to the type and color development characteristics of the heat-sensitive tape 9. In this case, as shown in FIG. 9, the CPU 21 may perform processing (S12) of reading out an energization pattern of a print color from the energization pattern table, regardless of whether or not the print color, instead of the processing of S3 to S11 in the label preparation process.

Figure 10:
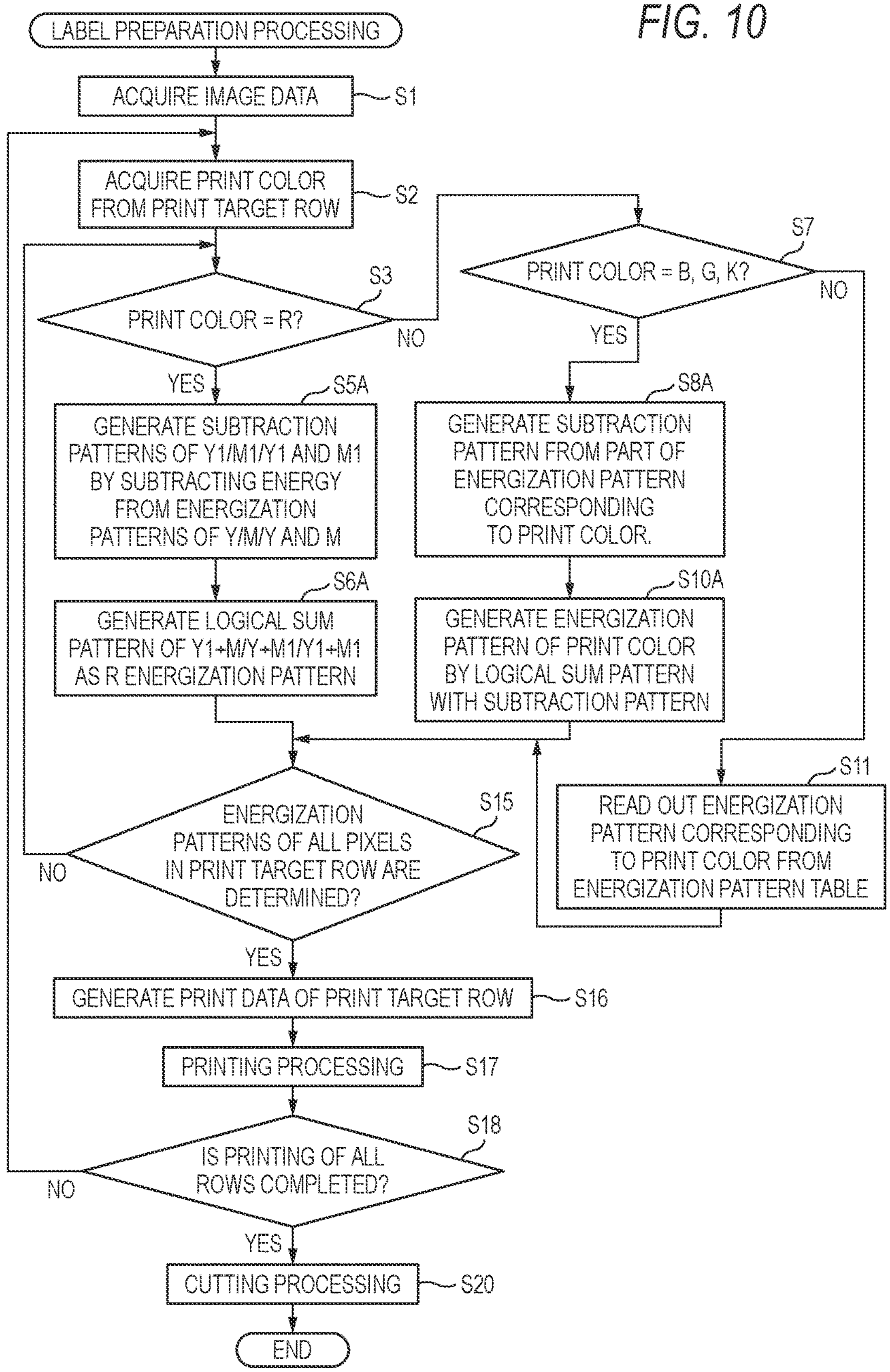
FIG. 10 is a flowchart of a modified embodiment of the label preparation processing when a portion of an amount of energy is subtracted before calculating a logical sum of energization patterns.

Further, as shown in FIG. 10, the CPU 21 may execute S5A, S6A, S8A, and S10A, respectively, instead of the processing of S5, S6, S8, and S10 in the label preparation processing. That is, when the print color of the print target row is R (S3: YES), the CPU 21 reads out the Y energization pattern and the M energization pattern from the energization pattern table, and generates a subtraction pattern of at least one of Y1 or M1 obtained by subtracting a portion of an amount of energy from at least one of the Y energization pattern or the M energization pattern (S5A). Then, the CPU calculates a logical sum of Y1+M, Y+M1 or Y1+M1 to generate the R energization pattern (S6A). In addition, when the print color is B, G or K (S3: NO, S7: YES), the CPU 21 reads out the energization patterns of colors necessary for mixing of the print color from the energization pattern table, and similarly, generates a subtraction pattern obtained by subtracting a portion of an amount of energy from at least one energization pattern (S8A). Then, the CPU calculates a logical sum of the energization pattern and the subtraction pattern to generate an energization pattern of the print color (S10A). In this way, the processing having a procedure reverse to that of the present embodiment, in which a portion of the amount of energy is subtracted from the energization pattern before calculating the logical sum of the energization patterns, may be performed.

Note that, in the present embodiment, the CPU 21 performs printing processing for each row of the print target row, but print data for all rows may be first generated and then printing processing based on the print data may be performed.

The heat-sensitive layer 92 may be configured by two layers or may be configured by four or more layers. In addition, the color of each layer is not limited to C, M, and Y, but may be R, G, B, K, or another color. Further, the same color of different depths may be set as the color of each layer. Note that, when the heat-sensitive layer 92 is configured by four layers, the fourth color is preferably K.

A program for performing the processing of S1 to S16 of the label preparation processing may be installed and executed as a printer driver in the external terminal. In this case, the printing apparatus 1 may acquire print data from the external terminal, form print dots on the heat-sensitive tape 9 according to the print data, and generate a label.

What is claimed is:

1. A printing apparatus comprising:

a thermal head having a plurality of heat-generating elements aligned in a line form;

a conveyor configured to convey a print medium in a conveying direction orthogonal to a serial direction in which the plurality of heat-generating elements are aligned in the thermal head, the printing apparatus being configured to form print dots on the print medium conveyed by the conveyor;

a processor configured to:

generate a signal pattern for causing the plurality of heat-generating elements to selectively generate heat based on image data; and control an application of energy to the heat-generating elements according to the signal pattern, for each printing cycle that is repeated continuously, wherein the print medium comprises at least:

a first color development layer configured to develop a first color due to energy applied from the heat-generating elements; and a second color development layer having a color development characteristic different from that of the first color development layer and configured to develop a second color due to energy applied from the heat-generating elements, wherein the signal pattern is configured by a pattern in which application information of indicating a period for applying energy to the heat-generating elements and non-application information of indicating a period not for applying energy to the heat-generating elements are combined, wherein the processor is configured to generate the signal pattern by a combination of:

a first signal pattern that is used in a case of causing the first color development layer singly to develop a color to form a print dot of the first color;

a second signal pattern that is used in a case of causing the second color development layer singly to develop a color to form a print dot of the second color; and a third signal pattern that is used in a case of causing each of the first color development layer and the second color development layer to develop each color to form a print dot of a mixed color of the first color and the second color, and wherein the third signal pattern is configured based on a logical sum of the first signal pattern and the second signal pattern, and is a pattern for applying a smaller amount of energy to the heat-generating elements than an amount of energy to be applied to the heat-generating elements according to a pattern configured by a mere logical sum of the first signal pattern and the second signal pattern.

2. The printing apparatus according to claim 1, wherein the third signal pattern is configured by a logical sum of the first signal pattern, and a fourth signal pattern that is a pattern in which a part of the application information of the second signal pattern is subtracted and an amount of energy to be applied to the heat-generating elements is made smaller than that of the second signal pattern, and wherein in the printing cycle, a print dot to be formed according to the first signal pattern is completed to be formed earlier than a print dot to be formed according to the second signal pattern.

3. The printing apparatus according to claim 2, wherein in a case where the processor generates the third signal pattern, the processor is configured to perform subtraction processing of reducing a number of chopping times on a part, in which chopper control of repeating the application information and the non-application information multiple times is performed, of the second signal pattern in which the application information is subtracted, to generate the fourth signal pattern.

4. The printing apparatus according to claim 2, wherein in a case where the processor generates the third signal pattern, the processor is configured to perform subtraction processing of reducing a ratio of the application information with respect to the non-application information, on the application information of a part of the second signal pattern in which the application information is subtracted, to generate the fourth signal pattern.

5. The printing apparatus according to claim 1, wherein the third signal pattern is configured by a logical sum of the second signal pattern, and a fourth signal pattern that is a pattern in which a part of the application information of the first signal pattern is subtracted and an amount of energy to be applied to the heat-generating elements is made smaller than that of the first signal pattern, and wherein in the printing cycle, a print dot to be formed according to the first signal pattern is completed to be formed earlier than a print dot to be formed according to the second signal pattern.

6. The printing apparatus according to claim 5, wherein in a case where the processor generates the third signal pattern, the processor is configured to perform subtraction processing of reducing a number of chopping times on a part, in which chopper control of repeating the application information and the non-application information multiple times is performed, of the second signal pattern in which the application information is subtracted, to generate the fourth signal pattern.

7. The printing apparatus according to claim 5, wherein in a case where the processor generates the third signal pattern, the processor is configured to perform subtraction processing of reducing a ratio of the application information with respect to the non-application information, on the application information of a part of the first signal pattern in which the application information is subtracted, to generate the fourth signal pattern.

8. The printing apparatus according to claim 1, wherein the third signal pattern is a pattern in which a part of the application information of a fourth signal pattern configured by a logical sum of the first signal pattern and the second signal pattern is subtracted and an amount of energy to be applied to the heat-generating elements is made smaller than that of the fourth signal pattern.

9. The printing apparatus according to claim 8, wherein in a case where the processor generates the third signal pattern, the processor is configured to perform subtraction processing of reducing a number of chopping times on a part, in which chopper control of repeating the application information and the non-application information multiple times is performed, of the fourth signal pattern in which the application information is subtracted, to generate the third signal pattern.

10. The printing apparatus according to claim 8, wherein in a case where the processor generates the third signal pattern, the processor is configured to perform subtraction processing of reducing a ratio of the application information with respect to the non-application information, on the application information of a part of the fourth signal pattern in which the application information is subtracted, to generate the third signal pattern.

11. A printing method of, in a printing apparatus comprising a thermal head having a plurality of heat-generating elements aligned in a line form, and a conveyor configured to convey a print medium, which comprises at least a first color development layer configured to develop a first color due to energy applied from the heat-generating elements, and a second color development layer having a color development characteristic different from that of the first color development layer and configured to develop a second color due to energy applied from the heat-generating elements, in a conveying direction orthogonal to a serial direction in which the plurality of heat-generating elements are aligned in the thermal head, the printing apparatus being configured to form print dots on the print medium conveyed by the conveyor, the printing method comprising the steps of:

generating a signal pattern for causing the plurality of heat-generating elements to selectively generate heat based on image data; and controlling an application of energy to the heat-generating elements according to the signal pattern, for each printing cycle that is repeated continuously, wherein the signal pattern is configured by a pattern in which application information of indicating a period for applying energy to the heat-generating elements and non-application information of indicating a period not for applying energy to the heat-generating elements are combined, wherein the processor is configured to generate the signal pattern by a combination of:

a first signal pattern that is used in a case of causing the first color development layer singly to develop a color to form a print dot of the first color;

a second signal pattern that is used in a case of causing the second color development layer singly to develop a color to form a print dot of the second color; and a third signal pattern that is used in a case of causing each of the first color development layer and the second color development layer to develop each color to form a print dot of a mixed color of the first color and the second color, and wherein the third signal pattern is configured based on a logical sum of the first signal pattern and the second signal pattern, and is a pattern for applying a smaller amount of energy to the heat-generating elements than an amount of energy to be applied to the heat-generating elements according to a pattern configured by a mere logical sum of the first signal pattern and the second signal pattern.

12. A non-transitory computer-readable storage medium storing a printing program executable by a computer of a printing apparatus that comprises a thermal head having a plurality of heat-generating elements aligned in a line form, and a conveyor configured to convey a print medium, which comprises at least a first color development layer configured to develop a first color due to energy applied from the heat-generating elements, and a second color development layer having a color development characteristic different from that of the first color development layer and configured to develop a second color due to energy applied from the heat-generating elements, in a conveying direction orthogonal to a serial direction in which the plurality of heat-generating elements are aligned in the thermal head, the printing apparatus being configured to form print dots on the print medium conveyed by the conveyor, the printing program comprising instructions that, when executed by the computer, cause the printing apparatus to perform:

generating a signal pattern for causing the plurality of heat-generating elements to selectively generate heat based on image data; and controlling an application of energy to the heat-generating elements according to the signal pattern, for each printing cycle that is repeated continuously, wherein the signal pattern is configured by a pattern in which application information of indicating a period for applying energy to the heat-generating elements and non-application information of indicating a period not for applying energy to the heat-generating elements are combined, wherein the processor is configured to generate the signal pattern by a combination of:

a first signal pattern that is used in a case of causing the first color development layer singly to develop a color to form a print dot of the first color;

a second signal pattern that is used in a case of causing the second color development layer singly to develop a color to form a print dot of the second color; and a third signal pattern that is used in a case of causing each of the first color development layer and the second color development layer to develop each color to form a print dot of a mixed color of the first color and the second color, and wherein the third signal pattern is configured based on a logical sum of the first signal pattern and the second signal pattern, and is a pattern for applying a smaller amount of energy to the heat-generating elements than an amount of energy to be applied to the heat-generating elements according to a pattern configured by a mere logical sum of the first signal pattern and the second signal pattern.

* * * * *